United States Patent [19]

Kopernicky

[11] Patent Number: 4,812,086
[45] Date of Patent: Mar. 14, 1989

[54] PARTICULATE MATERIAL LOADER

[75] Inventor: Jaroslav Kopernicky, Bramalea, Canada

[73] Assignee: Stream Industrial Systems Inc., Mississauga, Canada

[21] Appl. No.: 860,837

[22] Filed: May 8, 1986

[30] Foreign Application Priority Data

May 8, 1985 [CA] Canada ................. 481,036

[51] Int. Cl.⁴ ............................................. B65G 53/14
[52] U.S. Cl. ..................................... 406/153; 406/23; 406/106; 406/114; 406/143
[58] Field of Search .................................. 406/23-25, 406/32-35, 106, 141-144, 151-153, 113-116, 173

[56] References Cited

U.S. PATENT DOCUMENTS

| | | | |
|---|---|---|---|
| 469,175 | 2/1892 | Schutte et al. | 406/116 |
| 783,177 | 2/1905 | Cluff | 406/115 |
| 1,125,413 | 1/1915 | Van Doren | 406/152 |
| 1,337,738 | 4/1920 | Von Porat | 406/141 X |
| 1,942,379 | 1/1934 | Thompson | 406/142 |
| 2,413,479 | 12/1946 | Wiegand | 406/25 |
| 2,774,636 | 12/1956 | Whitlock | 406/153 X |
| 3,186,768 | 6/1965 | Pendelton | 406/23 |
| 3,423,130 | 1/1969 | Milner | 406/23 |
| 3,614,166 | 10/1971 | Spitz | 406/33 |

FOREIGN PATENT DOCUMENTS 1406647 6/1965 France ................. 406/153

Primary Examiner—Sherman D. Basinger
Assistant Examiner—Paul E. Salmon
Attorney, Agent, or Firm—Sim & McBurney

[57] ABSTRACT

A filterless loader which entrains particulate material in air flows is described. The loader includes a reservoir in which the materials may be accumulated and from which the materials may be delivered under gravity through a lowermost outlet to appropriate processing equipment. A closed air circuit draws the particulate material into the reservoir from an external storage bin or container. The closed air circuit includes air supply and return conduits communicating with the interior of the reservoir, and a fan unit which circulates air through the conduits. The fan unit draws air from the interior of the reservoir, and forces the air into an inlet end of the supply conduit. A gap is maintained at the junction of the air supply and return conduits external to the reservoir, and supply conduit air flows are guided by a nozzle across the gap into the return conduit. The junction is inserted into the storage container thereby introducing the particulate material into the path of the closed air circuit. An air flow diffusing region between the return conduit and the air inlet of the fan unit causes particulate materials entrained in the return air flows to settle to the bottom of the reservoir where they can be delivered under gravity to the processing equipment. Particulate material is confined to the closed circuit air flows thereby preventing scattering to the enviroment, and no filter commonly used in prior loader is needed to reduce emission of particles.

4 Claims, 2 Drawing Sheets

PARTICULATE MATERIAL LOADER

FIELD OF THE INVENTION

The invention relates to particulate material loaders, and more specifically, to loaders in which particulate materials are entrained with air flows from a convenient source to an accumulator which subsequently delivers the materials to appropriate processing equipment.

DESCRIPTION OF THE PRIOR ART

The particulate material loader of the invention has specific, though not exclusive, application to the delivery of particulate plastic materials to processing equipment such as an extruder or injection molder.

One device commonly used in the plastics industry to load particulate plastic material operates on essentially the same principle as an ordinary vacuum cleaner. A hopper or reservoir is provided to accumulate the particulate plastic. The reservoir is fitted with a flexible conduit which communicates with the interior of the reservoir and which has an open end external to the reservoir, inserted into a container of the particulate plastic. An electric motor and fan unit force air from the interior of the reservoir into the external environment thereby causing a vacuum effect or negative pressure difference which draws air together with the particulate plastic through the conduit into the reservoir. An enlarged air flow diffusing region in the reservoir causes a slowing of air flows and a consequent deposition of entrained particulate plastic to the bottom of the reservoir. The particulate plastic accumulating in the reservoir escapes under gravity through a material outlet at the bottom of the reservoir into appropriate processing machinery.

In the loader described, air is forced from the interior of the reservoir past the electric motor (to obtain a measure of motor cooling) and then into the adjoining environment. A filter is required to prevent particles of plastic materials from fouling the motor and scattering into the immediate environment. Such a filter has a tendency to clog, particularly where light or flaky plastic particles are being loaded, and tend to cause serious overloading of the motor which encounters increased resistance to air flow. Producers of such loaders have fitted their devices with compressed air "blow-back" units which are periodically activated to force accumulated materials from the filter, causing the materials to deposit to the bottom of the reservoir. This de-clogging process requires periodic stoppage of the loading process, and is often insufficient in itself to adequately clean a filter, making periodic filter replacement necessary.

Another type of particulate material loader commonly used in the plastics industry involves a reservoir and flexible conduit as described above, but uses compressed air to induce material movement through the extension conduit into the reservoir. Essentially, a nozzle is inserted into the extension conduit, and a source of compressed air applied to the nozzle to produce an air flow, towards the interior of the reservoir, which entrains particulate plastic from a convenient storage container. The top of the reservoir is essentially open to permit escape of the induced air flows to the environment, and once again an air flow diffusing region is used to deposit entrained particles to the bottom of the reservoir. A filter must of course be placed in the flow path to prevent emission of particulate plastic to the adjoining environment. In large manufacturing plants, where a source of compressed air is likely to be available, and where a large number of loaders are required, such a system has the advantage that an electric motor and fan unit need not be associated with each loader. One compressor can meet the propelling requirements of a number of loaders, and the loaders are accordingly less complex and less expensive. A disadvantage is that compressed air normally carries moisture, oil required for proper operation of the compressor and other pollutants, which can seriously affect the quality of the plastic resins being processed. Another disadvantage is filter clogging, and once again a compressed air blow-back arrangement is sometimes used to periodically clean filters. In this type of system, the blow-back arrangement is particularly unsatisfactory, as particulate plastic tends to be spread extensively into the environment during blow-back.

It is one object of the present invention to provide a particulate material loader which inherently reduces scattering of particulate materials to the environment.

It is another object of the invention to provide an embodiment of such a loader which entrains particulate materials with air flows, but which can be operated without a filter.

BRIEF SUMMARY OF THE INVENTION

The invention provides a particulate material loader having a reservoir which serves to accumulate particulate materials and which has a material outlet for delivering the accumulated materials to appropriate processing equipment. The loader includes an air supply conduit, an air return conduit which communicate with the interior of the reservoir, and air flow generating means for forcing air from the interior of the reservoir into the supply conduit. A junction is formed between the supply and return conduits external to the reservoir, at which junction a gap is maintained between the supply and return conduits and at which air flows from the supply conduit are guided generally towards an inlet in the return conduit. Inserting the junction of the supply and return conduits into a mass of particulate material, and precluding any substantial air flow into the material outlet (which requirement is easily met in most applications where prior art devices have been used), causes the particulate material to be drawn into the reservoir. An air flow diffusing region provided in the interior of the reservoir between the air return conduit and the air flow generating means causes a settling of particulate materials entrained by air flows in the return conduit to the bottom of the reservoir where they can be delivered to the processing equipment through the material outlet.

The loaders of the present invention involve a principle of operation different from that of the prior art loaders described above. The reservoir, supply conduit and return conduit essentially constitute a closed, air flow circuit. The air flow generating means which might typically be a fan blade unit mounted within the reservoir, and an electric motor essentially external to the reservoir, cause air in the reservoir to be circulated through the supply conduit, and back through the return conduit into the interior of the reservoir. Intoduction of ambient air or discharge of air flows to the environment is avoided. The gap provided at the junction of the supply and return conduits permits particulate plastic to be introduced into the closed circuit and entrained by the closed circuit air flows to the reservoir. This arrangement significantly reduces emission of particulate materials to the environment. Also, in connection with the loading of hygroscopic materials, whose processing may be affected by water content, the loader reduces exposure of the materials to ambient air thereby reducing moisture absorption. As will be apparent from the preferred embodiment described below, the loaders of the invention are by no means "air-tight", and some ambient air flow into the loader system and some discharge of system air to the environment are expected.

Other advantages and inventive aspects of the present development will be outlined in greater detail in the description of a preferred embodiment below.

DESCRIPTION OF THE DRAWINGS

The invention will be better understood with reference to drawings in which.

DESCRIPTION OF PREFERRED EMBODIMENT

Figure 1:
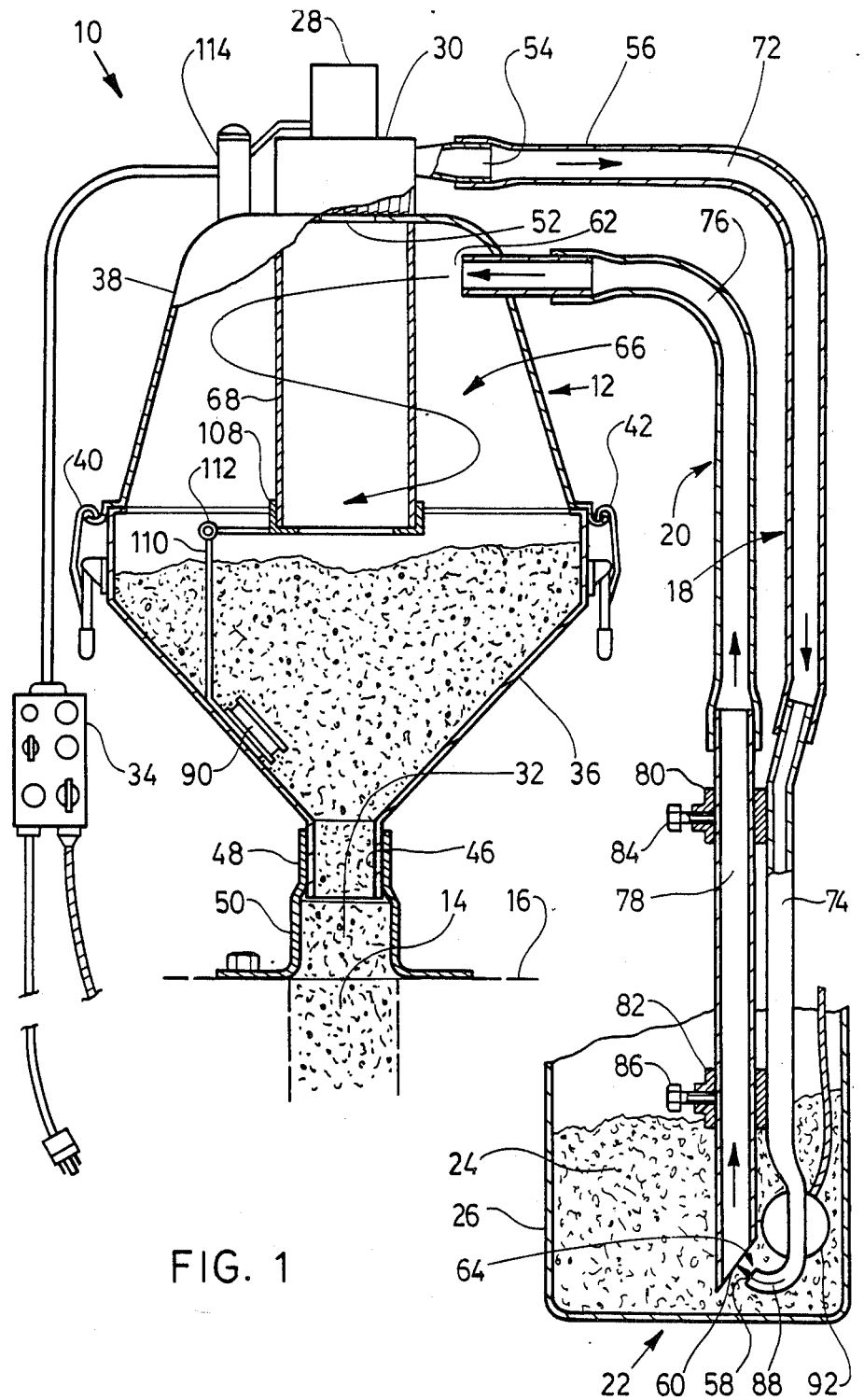
FIG. 1 diagrammatically illustrates in cross-section a preferred embodiment of a particulate material loader; and, FIG. 2 diagrammatically illustrates in cross-section a pressure sensor associated with the loader.

FIG. 1 illustrates a filterless loader 10 for loading of particulate plastic material. The loader 10 includes a reservoir 12 which is shown mounted above the material inlet 14 of a plastic processing machine 16 (fragmented) which may be an extruder or injection molder. The loader 10 also includes an air supply conduit 18 and an air return conduit 20, which have a junction 22 external to the reservoir 12. The junction 22 of the air supply and return conduits is embedded in a mass of particulate plastic material 24 stored in a container 26. An electric motor 28 and fan blade unit 30 generate air flows which cause the particulate plastic 24 to be introduced into the loader 10 at the junction 22 and to be drawn from the container 26 into the interior of the reservoir 12. The material accumulating in the reservoir 12 escapes under gravity through a material outlet 32 at the bottom of the reservoir 12 into the plastic processing machine 16, at a rate determined by operation of the machine 16. A manually-operable controller 34 along with certain sensors described in greater detail below regulate operation of the loader 10.

The reservoir 12 is defined by a sheet metal housing formed in two parts. A bottom section 36 of generally conical shape and an upper section 38 of generally frustoconical shape are attached to one another by means of releasable clamps 40,42. The bottom section 36 has a downwardly directed cylindrical extension 46 which defined the material outlet 32. The cylindrical extension 46 is closely received within the neck 48 of an attachment member 50 which is bolted about the material inlet 14 of the plastic processing machine 16. This arrangement permits the reservoir 12 to be conveniently removed for inspection and maintenance.

A "reservoir" within the meaning of this specification need not be a completely sealed container. It is sufficient that the reservoir is sealed against any substantial extraneous air flows in the context in which it is used. For example, air can enter through the reservoir's material outlet 32. It is sufficient that no substantial air flows are returned under negative pressure through the reservoir's material outlet 32 from the machine 16 which is used in association with the loader 10.

Air flows required to entrain particulate plastic from the container 26 to the interior of the reservoir 12 are generated by the electric motor 28 and fan blade unit 30. The fan blade unit 30 is a three stage device (having three distinct sets of blades) which draws air from the interior of the reservoir 12 through an air inlet 52 and which expels the air so drawn through an air outlet 54 into the air supply conduit 18. The motor 28 is external to the reservoir 12, having an air cooling system whose air flows are entirely external to those associated with the entrainment of particulate plastic. In this particular embodiment of the invention, the fan blade unit 30 is mounted in the interior of the reservoir 12; however, the primary function of the fan blade unit 30 is to force air from the interior of the reservoir 12 into the supply conduit 18, and this function could be achieved, for example, with an appropriate fan unit mounted directly in-line with the supply conduit 18.

The loader 10 is designed for closed-circuit air circulation. The supply conduit 18 has an inlet end 56 which communicates with the air outlet of the fan blade unit 54, and an outlet end 58 located external to the reservoir 12. The return conduit 20 has an inlet end 60 external to the reservoir 12 and an outlet end 62 which communicates directly with the interior of the reservoir 12. A gap 64 is maintained between the supply conduit outlet end 58 and the return conduit inlet end 60 where particulate plastic is introduced into the closed circuit air flows for entrainment through the return conduit 20 to the interior of the reservoir 12.

The reservoir 12 has an air flow diffusing region 66 in the flow path between the return conduit outlet end 58 and the air inlet 52 of the fan blade unit 30. This is a region of the air flow path of expanded cross-section which causes a marked reduction in air flow speed, and consequently a deposition of entrained particulate plastic to the bottom of the reservoir 12. The region essentially separates the particulate plastic from the closed circuit air flows.

An extension conduit 68 enhances the deposition process. The conduit 68 extends downwardly from the air inlet 52 of the fan blade unit 30 to a point several inches below the return conduit outlet end 62. This arrangement forces air flows from the return conduit outlet end 62 downwardly prior to return to the fan air inlet 52. The return conduit outlet end 62 is preferrably positioned to direct return air flows tangentially past the extension conduit 68 thereby causing a smooth spirally of air flows downwardly around the extension conduit 68. By directing the entrained particulate materials downwardly in the air diffusion region 66, settling of the particles under gravity is enhanced. The provision of the extension conduit 68 or an equivalent mechanical structure is not absolutely necessary to the operation of the invention. One can instead provide a significantly larger air flow diffusing region to obtain an adequate settling of the entrained particulate materials. For example, the reservoir 12 can be made considerably taller, and perhaps wider, and the return conduit outlet end 62 can then be spaced further down from the fan air inlet 52. Use of the extension conduit, however, provides the very significant advantage of overall reduction of the size of the loader 10.

The junction 22 between the supply and return conduits 18, 20 can be moved and the gap 64 adjusted. The supply conduit 18 consists of an upper length of flexible plastic tubing 72 which closely receives a lower length of rigid metal tubing 74. The return conduit 20 is similarly formed of an upper length of flexible plastic tubing 76 which closely receives a lower length of rigid metal tubing 78. The two metal tubes 74, 78 are maintained in substantially parallel relationship by two vertically-aligned metal collars 80, 82 which are fixed to the outside of the metal tube 74 and which internally receive the metal tube 78. The metal tubes 74, 78 may be displaced axially relative to one another to vary the size of the gap 64 because of the inherent flexibility of the upper plastic tubes 72, 76, and then secured rigidly to one another by means of set screws 84, 86 appropriately fitted in the metal collars 80, 82 respectively. Also because of the inherent flexibility of the upper plastic tubes 72, 76, the junction 22 can be moved in and out of the container 26.

Air flows between the supply and return conduits 18, 20 are guided across the gap 64. The general object is to ensure substantially closed circuit air flow, avoiding at the gap 64 excessive dissipation of supply conduit flows to the environment and the drawing of excessive amounts of ambient air into the return conduit 20. To that end, the supply conduit metal tube 74 is formed with a narrow nozzle 88 which concentrates and directs air flows, and the return conduit inlet end 60 is bevelled and oriented to receive air flows from the nozzle 88 in a direction substantially axial to the opening in the return conduit inlet end. The opening in the return conduit inlet end 60 is also larger than the opening in the nozzle 88, permitting the gap 64 to be adjusted by relative axial displacement of the metal tubes 74, 78 without misdirecting nozzle air flows.

The junction 22 has also been designed to ensure that uptake of particulate material does not cease, when the container 26 is otherwise full, by exhaustion of particulate material in the immediate vicinity of the gap 64. For example, if the nozzle 88 were shaped to sweep through a full 180 degrees so that supply conduit air flows were directed upwardly, and the return conduit outlet end 62 were substantially horizontal, the junction would tend to be supported by subjacent particulate plastic, once materials around the gap 64 were taken up. An operatore would thus be required to periodically stir the junction 22 and further embed the junction 22 vertically into the particulate plastic to ensure continued accumulation of material in the reservoir 12. In the embodiment illustrated, the return conduit inlet end portion adjacent its inlet 60, and the supply conduit outlet end portion adjacent its outlet end 58 have been shaped to avoid this problem. Basically, the bevelling of the supply conduit inlet end 60, and the corresponding change in shape of the nozzle 88 required to direct air flows into the inlet end 60, causes air flows in the gap 64 to draw particulate material from below the inlet end 60 and the nozzle 88 into the return conduit 20. Thus, in use, with the junction 22 embedded vertically in a mass of particulate plastic, the junction 22 tends to lower itself into the particulate plastic with uptake of the material. The nozzle 88, of course, is dimensioned so that it does not extend more than a roughly predetermined distance below the inlet end portion of the return conduit 20 so that this downward progression of the junction 22 into the material is not thereby hampered.

The gap 64 between the nozzle 88 and the return conduit inlet end 60 may typically be in the order of one-half to one and one-half inches. The spacing should, however, be determined empirically with a view to ensuring that particulate plastic is taken up at a rate corresponding to consumption of the particulate plastic by the processing machine.

A number of matters regarding the formation of the junction 22 and gap 64 should be noted. An excessively small gap will markedly reduce material uptake, and insertion of the nozzle 88 into the supply conduit inlet end 60 defeats operation of the loader. Excessive spacing on the other hand will tend to defeat closed circuit operation. Also, in any embodiment adopted, care should be taken to guide supply conduit air flows into the return conduit. One arrangement originally considered by the inventor involved running the supply conduit coaxially down down the interior of the return conduit, and make the supply conduit outlet end terminate flush with the return conduit inlet end. This arrangement produces a more compact junction, but results in inadequate pick-up of particulate materials. In any arrangement considered, measures should be taken to sufficiently guide air flows between the supply and return conduits that closed-circuit operation and adequate pick-up of particulate materials are ensured.

Figure 2:
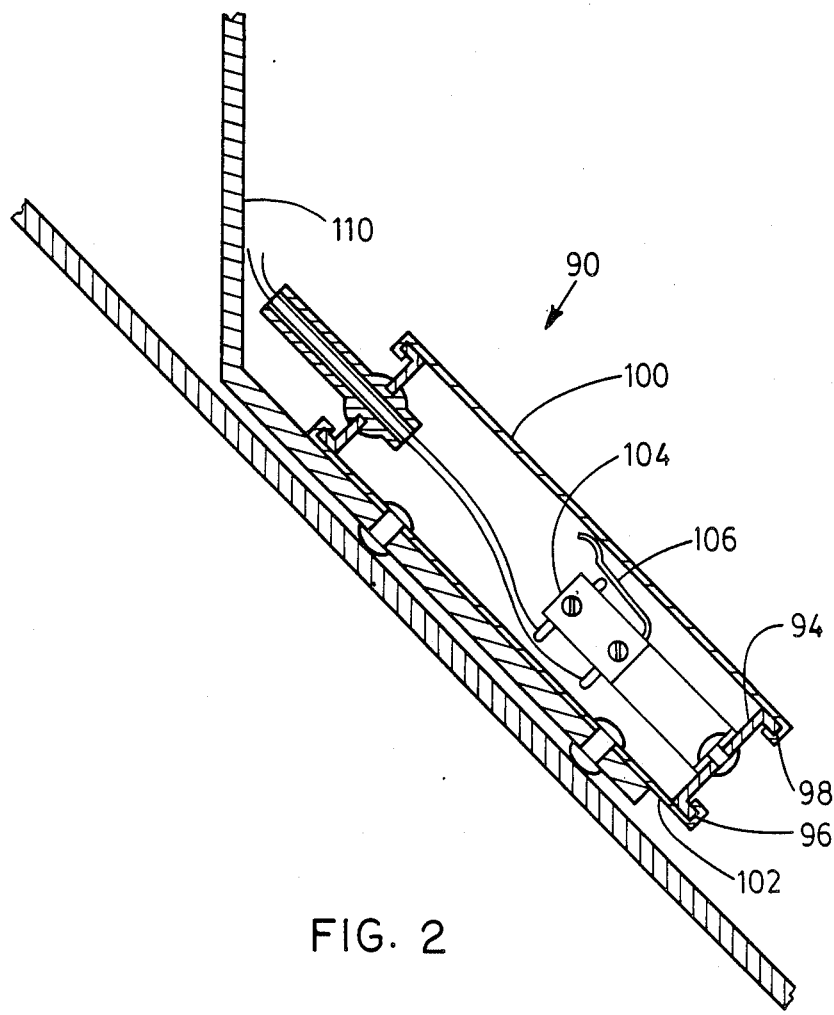

The loader 10 includes two weight or pressure sensors 90, 92. The sensor 92 is illustrated diagrammatically in the view of FIG. 2. The sensor 90 consists basically of a short section 94 of metal conduit whose open ends are formed with circumferential flanges 96, 98 which extend radially outwardly. Two flexible membranes 100, 102 formed of a polyurethane material are molded in the shape illustrated, and releasably snap fit over the flanges 96, 98. A conventional microswitch 104 is fixed to the conduit 94, with its trip lever 106 positioned adjacent the membrane 100.

The sensor 90 is supported from the extension conduit 68. An apertured cup-shaped member 108 is set screw fitted to the bottom of the extension conduit 68. The sensor 90 is secured to a metal bracket 110, having a hinge joint 112, by pop rivetting the membrane 102 to the bracket 110. An upper end of the bracket 110 is attached to the cup-shaped member 108. The bracket 110 is appropriately bent so that together with the hinge joint 112 it causes the sensor 100 to seat against the angled side wall of the bottom section 36 of the reservoir 12.

The microswitch 104 is normally in a closed state. Accumulation of a substantially predetermined amount of material in the reservoir 12 (essentially the amount of material illustrated in FIG. 1) causes deflection of the membrane 100 and tripping of the microswitch 104 to an open state. The microswitch 104 is coupled to the controller 34 which responds to the open state of the microswitch 104 by discontinuing operation of the electric motor 28, and consequently accumulation of particulate material in the reservoir. The microswitch 104 disables motor and fan operation until a quantity of the accumulated particulate plastic material has been processed by the machine 16.

The pressure sensor 92 is substantially identical to the sensor 90, and is pop rivetted in a similar manner to the supply conduit tube 74. It responds essentially to the amount of particulate plastic which has accumulated within the container 26. When the amount of particulate plastic becomes excessively low, the sensor 92 signals the controller 34 and causes actuation of an indicator light 114 prominently positioned on the loader 10. This signals an operator that the supply of particulate plastic must be replenished.

It will be appreciated that a particular embodiment of the invention has been described and that modifications may be made therein without departing from the spirit of the invention or the scope of the appended claims.

I claim:

1. A particulate plastic loader comprising:

a reservoir having a material outlet in a lower portion thereof;

an air supply conduit having an inlet end and having an outlet end portion external to the reservoir;

an air return conduit having an inlet end portion external to the reservoir and having an outlet end communicating with the interior of the reservoir, the inlet end portion having an inlet end surface which has a general plane forming an acute angle relative to the general axis of the inlet end portion;

air flow generating meansfor forcing air from the interior of the reservoir into the inlet end of the supply conduit, the air flow generating means having an air inlet communicating with the interior of the reservoir and an air outlet communicating with the inlet end of the supply conduit;

the interior of the reservoir having an air flow diffusing region between the outlet end of the return conduit and the air inlet of the air flow generating means; and, junction means for joining the outlet end portion of the supply conduit and the inlet end portion of the return conduit to form a junction at which the outlet end portion of the supply conduit and the inlet end portion of the return conduit are maintained in generally parallel side-by-side relationship, a gap is maintained between the inlet end surface of the return conduit and the outlet end portion of the supply conduit, and the inlet end surface of the return conduit faces towards the outlet end portion of the supply conduit;

the outlet end portion of the supply conduit being terminated with an air flow deflecting structure that deflects air flows from the outlet end portion of the supply conduit across the gap directly towards the inlet end surface and into the inlet end portion of the return conduit;

the outlet end portion of the supply conduit and the air flow guiding structure extending no more than a predetermined distance below the inlet end surface of the return conduit when the junction is embedded in a generally vertical orientation in a mass of particulate plastic such that air flows in the gap draw sufficient particulate plastic from below the inlet end portion of the return conduit and the outlet end portion of the supply conduit that the junction lowers itself continuously into the mass of particulate plastic as particulates are entrained to the reservoir.

2. A loader as claimed in claim 1 comprising an extension conduit extending downwardly from the air inlet of the air flow generating means to a point in the interior of the reservoir below the outlet end of the return conduit at the reservoir whereby return air flow from the return conduit is deflected downwardly prior to entering the air inlet of the air flow generating means.

3. A loader as claimed in claim 1 in which the junction means comprise means permitting the supply conduit end portion to be displaced relative to the inlet end surface of the return conduit parallel to the general axis of the inlet end portion of the return conduit to adjust the size of the gap.

4. A loader as claimed in claim 1, comprising:

sensing means fixed relative to at least one of the return conduit inlet end portion and the supply conduit outlet end portion for sensing the amount of particulate material surrounding the junction; and, indicator means responsive to the sensing means for producing a predetermined signal when the amount of particulate material surrounding the sensing means drops below a predetermined level.

* * * * *